(12) United States Patent  
Claeys (10) Patent No.: US 6,848,261 B2  
(45) Date of Patent: Feb. 1, 2005

(54) CONDENSING CYCLE WITH ENERGY RECOVERY AUGMENTATION

(75) Inventor: Henry M. Claeys, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/407,621

(22) Filed: Apr. 3, 2003

(65) Prior Publication Data

US 2004/0195447 A1 Oct. 7, 2004

(51) Int. Cl.[7] .................................................. F25B 9/06
(52) U.S. Cl. ............................ 62/87; 62/259.2; 62/402
(58) Field of Search ............................. 62/86, 87, 172, 62/401, 402, 259.2

(56) References Cited

U.S. PATENT DOCUMENTS

| | | | |
|---|---|---|---|
| 5,086,622 A | 2/1992 | Warner | 62/172 X |
| 5,553,461 A * | 9/1996 | Hitzigrath | 62/402 X |
| 5,911,388 A | 6/1999 | Severson | 62/402 |
| 5,924,293 A | 7/1999 | Jonqueres | 62/402 X |
| 5,967,461 A | 10/1999 | Farrington | 454/74 X |
| 6,128,909 A | 10/2000 | Jonqueres | 62/87 |
| 6,148,622 A | 11/2000 | Sanger | 62/402 X |
| 6,189,324 B1 | 2/2001 | Williams | 62/172 |
| 6,250,097 B1 | 6/2001 | Lui et al. | 62/402 |
| 6,257,003 B1 | 7/2001 | Hipsky | 62/402 X |
| 6,381,969 B1 | 5/2002 | Afeiche | 62/87 |

* cited by examiner

Primary Examiner—Harry B. Tanner  
(74) Attorney, Agent, or Firm—Oral Caglar, Esq.

(57) ABSTRACT

A system and method for providing conditioned air to an aircraft cabin. The system combines the benefits of a traditional 4 wheel condensing cycle and dual expansion energy recovery cycles. The energy of a heat load such as aircraft electronic or avionics can be recovered and used in a second turbine while a continuous source of cooling for the heat load is provided for high altitude operation when the first turbine is by-passed. The disclosed invention conditions inlet air using an efficient process that recaptures energy that would otherwise be wasted. Recaptured energy can come from aircraft avionics and from moisture in inlet and cabin air.

26 Claims, 6 Drawing Sheets

CONDENSING CYCLE WITH ENERGY RECOVERY AUGMENTATION

BACKGROUND OF THE INVENTION

The present invention relates generally to apparatus and methods for conditioning inlet air for use in an aircraft cabin and, more particularly to apparatus and methods for conditioning cabin air while capturing and reusing energy that would otherwise be waste.

In aircraft operating in atmospheres with low pressure it is necessary to condition the cabin air to increase pressure and provide temperature and humidity control.

U.S. Pat. No. 6,250,097 shows a combined 4 wheel air cycle and liquid cycle system used to cool aircraft cabin air and avionics while recovering some heat energy in the process. In '097, an air cycle includes, inlet air from an aircraft turbine cooled by ambient air, compressed and cooled again by ambient air. The inlet air is then cooled again by use of reheat heat exchangers which route the warm moist inlet air over cooled inlet air downstream in the system. The inlet air is then expanded through a first turbine and water is extracted. The inlet air then enters an air to liquid heat exchanger where warm fluid containing heat energy from a liquid cycle used to cool the aircraft avionics is used to warm the inlet air. Then the inlet air passes through a reheater to gain energy from the next inlet air and is then expanded through a second turbine. The cool inlet air from this turbine is again warmed by the liquid cycle in a heat exchanger and the air is then supplied to the cabin. This arrangement recaptures some of the available energy from the heat of vaporization of the liquid from the air and from reject heat contained in the liquid cycle from aircraft avionics. However, '097 does not disclose a way to continue to cool the aircraft avionics when the avionics heat energy is not needed in the air cycle. Aircraft electronics and avionics must be cooled constantly or they will overheat. Therefore there must be a way to cool the avionics even when the waste energy is not needed. In operation, there are also conditions when it would be desirable to at least partially bypass some elements of an air conditioning system. For example, at high altitude operation when ambient air is cool and dry relative to cabin conditions, the first turbine in air cycles such as that shown in '097, is not needed. The first turbine has a smaller nozzle intake and therefore constricts flow more than the second turbine so the system shown in '097 bleeds air off the aircraft turbine engine that is not required to condition cabin space, wasting energy.

Another prior art example of the so-called 4-wheel environment control systems is shown in Warner U.S. Pat. No. 5,086,622. The Warner patent figure shows a bypass valve 72 that bypasses the first turbine during high altitude aircraft performance when the turbine would not be needed. For example, during high altitude performance, when ambient air is cooler and bleed air is less humid than at ground level, operation of the first turbine would waste energy by drawing un-needed bleed air from the turbine engine. The inefficient operation of Warner forces designers to build the system components, particularly heat exchangers, larger than needed which in turn wastes more aircraft fuel in carrying the additional weight.

As can be seen, there is a need for an improved condensing cycle energy recovery system that is compact and economical to operate. There is a need for an improved apparatus and method for condensing cycle energy recovery system that makes use of all energy available, including waste energy from aircraft avionics. There is further a need for a condensing cycle energy recovery system that is efficient so that system components can be sized as small as possible and still do the job of conditioning the aircraft cabin space.

SUMMARY OF THE INVENTION

In one aspect of the invention, an inlet takes air from a supply such as a bleed from an aircraft turbine engine and conditions the inlet air using a first air sub-cycle. The first air sub-cycle cools inlet air in a heat exchanger with ambient air and compresses it. A second heat exchanger and condenser further cools the inlet air and extracts moisture from the air upstream from a first turbine. Air expanded and cooled in the turbine then captures the heat of vaporization in the condenser to warm the now dry inlet air. A third heat exchanger further heats inlet air with waste heat from a heat load, and a second turbine expands the air for use as supply air to a space. An economy valve can be used for bypassing the condenser, first turbine and third heat exchanger, which make up a first air sub-cycle, for supplying inlet air directly to the second turbine. This bypass valve operates at high altitude when the first turbine would otherwise bleed off more air from the aircraft turbine engine than may be required to condition cabin space.

In another aspect of the invention, air from the first air sub-cycle can be heated using waste energy from aircraft electronics or avionics. The waste energy can be collected in a closed loop liquid or air sub-cycle and warms inlet air from the first air sub-cycle in an air/air or liquid/air heat exchanger.

In a further aspect of the invention, waste energy from the avionics load can be exchanged using an aircraft skin heat exchanger. Thus, when the bypass valve bypasses the first air sub-cycle it can also bypass the third heat exchanger and the un-needed waste energy from aircraft avionics. So at altitude, the waste energy from the avionics can be cooled by ambient air through the aircraft skin heat exchanger and the avionics have the needed constant source of cooling.

In a still further aspect of the invention, a method of providing conditioned air for an aircraft cabin is described. The method includes the steps of bleeding inlet air from an aircraft turbine engine, then cooling it, dehumidifying it and compressing it in an air sub-cycle that can recapture at least a portion of the heat of vaporization of the condensed moisture. The method also includes heating inlet air with a third heat exchanger using waste heat from the aircraft. The method includes expanding the inlet air in a second turbine. The method also includes a step of bypassing the first turbine when the aircraft is in ambient air that is cooler and dryer then the condition desired in the cabin. This step saves bleed air that would otherwise be unnecessarily bled from the aircraft engine by the first turbine. The efficiency of this arrangement allows system components to be smaller which saves even more aircraft space and fuel.

In another aspect of the invention, the method of conditioning aircraft cabin air includes bleeding inlet air from an aircraft turbine engine expanding, cooling and dehumidifying the inlet air, in a first air cycle. Then heating said inlet air with an air/air heat exchanger using waste heat from aircraft avionics.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

It is necessary to cool and condition air for supply to a cabin space of an aircraft. The system used must perform in a variety of conditions including in relatively warm moist air when the aircraft is on the ground and inlet air comes from an auxiliary power source, and in cool dry air when the aircraft is at high altitude. In flight it is common practice to use air bled from a turbine engine as inlet air and to condition the inlet air to cool and dehumidify the air. The disclosed invention conditions inlet air using an efficient process that recaptures energy that would otherwise be wasted. Recaptured energy can come from aircraft avionics and from moisture in inlet and cabin air.

Figure 1:
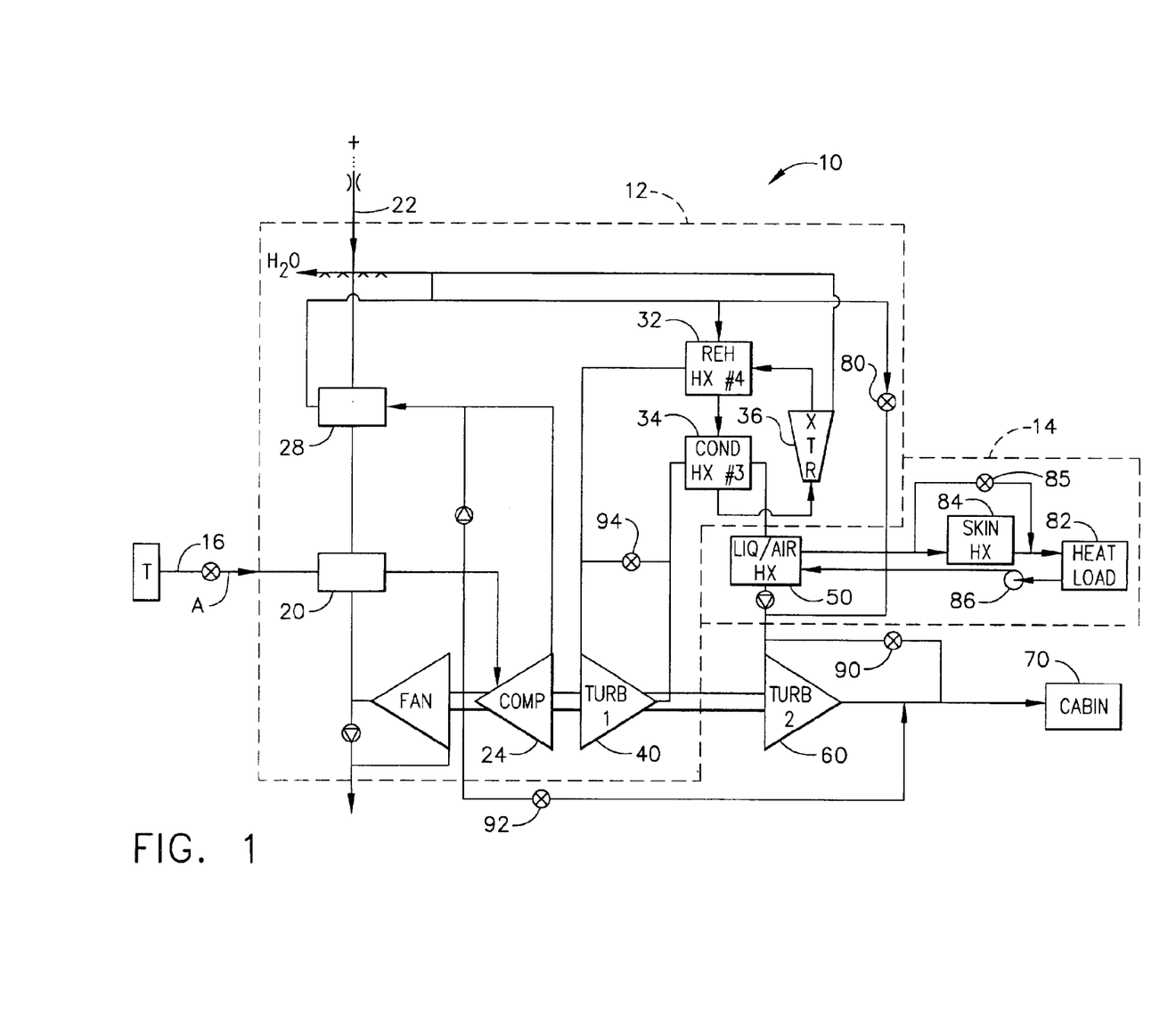
FIG. 1 shows a block diagram of the conditioning cycle according to one embodiment of the invention.

Referring now to the Figures, where like elements in different embodiments carry like numbers, FIG. 1 shows a schematic block diagram of a first embodiment of the condensing cycle energy recovery system 10. The energy recovery system 10 includes an air cycle sub-system 12 indicated by dashed lines and in this embodiment a liquid cycle sub-system 14 also indicated by dashed lines. The air cycle subsystem 12 may begin with inlet air 'A' from supply line 16. This inlet air 'A' in flight may be bled from the turbine engine 'T' of the aircraft (not shown). When the aircraft is on the ground air supply line 16 may connect to an auxiliary source (not shown). The inlet air 'A' may flow over a primary heat exchanger 20, which uses ambient air from ambient air inlet 22 to cool the inlet air 'A'. After the inlet air 'A' is cooled it may be compressed by compressor 24, and then cooled again by a second heat exchanger 28 again using ambient air from inlet 22. When the aircraft is on the ground, the moist inlet air 'A' may flow through regenerative heat exchanger 32 where it can be partially cooled and then the inlet air 'A' may flow through condenser 34 where it may be further cooled. Water may be condensed out by extractor 36, and cold dry inlet air 'A' may flow through the cold side of regenerative heat exchanger 32 to partially cool the next flow of air. Dry inlet air 'A' may then be supplied to the first turbine 40 where it may be expanded and used to condense water from the next flow of air through condenser 34. The inlet air 'A' may then flow through the liquid/air heat exchanger 50 where it may be further warmed how by the liquid cycle sub-system 14. The inlet air 'A' may then be supplied to the second turbine 60 where it may be expanded and supplied to cabin 70.

At altitudes where ambient air is cool compared to the desired cabin conditions, the economy cooling bypass valve 80 may open bypassing the first turbine 40 and air cycle sub-system 12 as they are not needed and bypassing them saves energy. The heat load 82, which may include aircraft electronics and avionics may be cooled, in this embodiment, with an aircraft skin heat exchanger 84 when the liquid/air heat exchanger 50 is bypassed. The aircraft skin heat exchanger 84 may include a low altitude bypass valve 85 which may bypass the aircraft skin heat exchanger 84 at low altitude so that the waste energy may be used by the second turbine 60. The liquid cycle sub-system 14 also may include a coolant pump 86 that can move liquid through the liquid/air heat exchanger 50 to cool inlet air 'A'.

FIG. 1 further shows a second turbine bypass valve 90. If the bypass valve 80 opens to bypass the first turbine 40, and if the system 10 still is able to supply more cool air then the cabin 70 requires, the turbine bypass valve 90 may open to at least partially bypass the second turbine 60 as well. Bypassing the second turbine 60 may save additional energy. Also shown in FIG. 1 is a low temperature control valve 92. With bypass valve 80 and turbine bypass valve 90 both open to bypass both first and second turbines 40 and 60, if the system is still supplying air to the cabin 70 that is too cool, then low temperature control valve 92 may open to mix some warm air from compressor 24 with the supply air to cabin 70. Should the actual first turbine 40 outlet temperature fall and ice form in the condenser 34, the low limit valve 94 may open to bypass just the first turbine 40.

Figure 2:
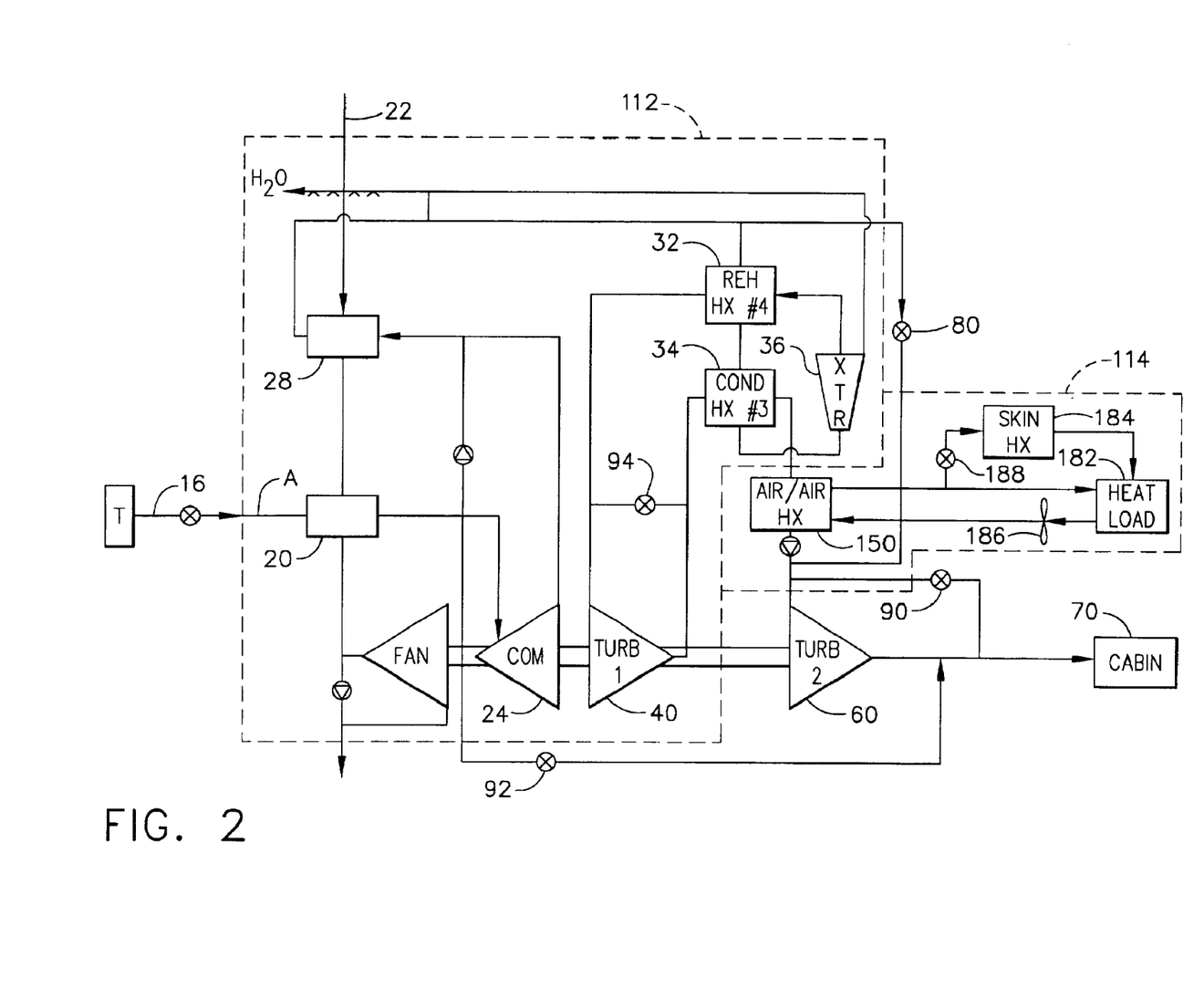
FIG. 2 shows a block diagram of a second embodiment of the present invention.

FIG. 2 shows a second embodiment. In this embodiment auxiliary cooling may be performed by a closed air sub-cycle 114. As in the first embodiment, cooling may occur at altitude through a skin heat exchanger 184, but in this case the fluid medium may be air. There may be a heat load 182 and a fan 186 may circulate air in the closed air sub-cycle 114. An air/air heat exchanger 150 may transfer heat from the closed air sub-cycle 114 to the air cycle sub-system 112. An inline valve 188 may open when ambient air temperature is below the desired cabin temperature, to allow flow through the skin heat exchanger 184 to cool the heat load 182 when the bypass valve 80 is open. Thus the heat load 182, which may include aircraft avionics, may have a constant source of cooling from closed air sub-cycle 114, while heat energy from the heat load 182 may perform useful work through the second turbine 60 when needed.

Figure 3:
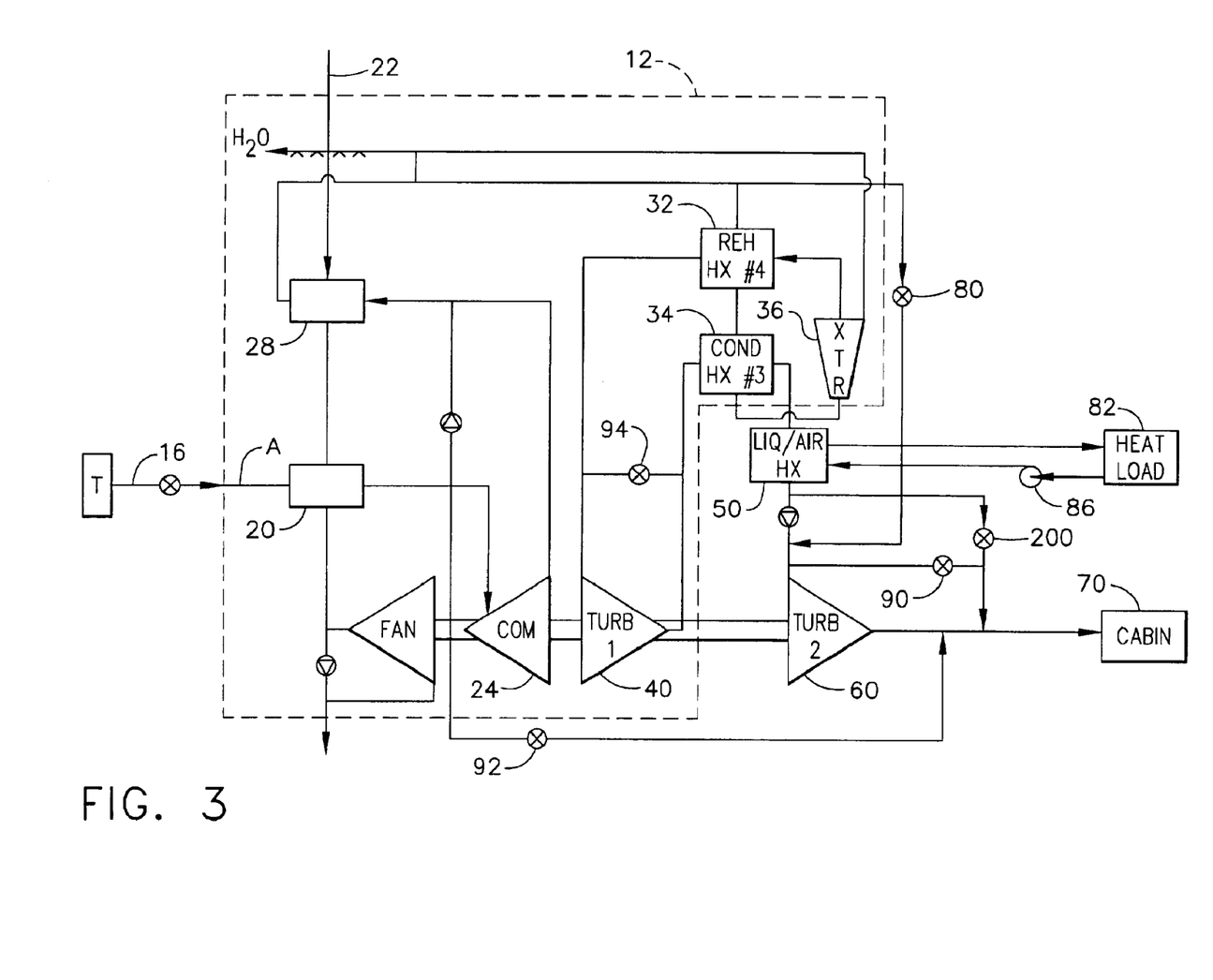
FIG. 3 shows a block diagram of a third embodiment of the present invention.

FIG. 3 shows an alternate embodiment. This embodiment is similar to that of FIG. 1 except for the use of an altitude load cooling valve 200. The altitude load cooling valve 200 may open up when the airplane is at altitude and when the economy cooling bypass valve 80 may be open. The altitude load cooling valve 200 may allow the portion of the inlet air 'A' that flows through turbine 40, condenser 34 and liquid to air heat exchanger 50, to bypass the second turbine 60. Then this portion of the inlet air 'A' may be remixed with the supply stream coming through economy cooling bypass valve 80 and the second turbine 60. This approach may have the advantage of allowing recovery of energy from both the heat of vaporization and the heat load 82 in the second turbine 60 during normal operation. It also may allow the heat load 82 to be continuously cooled during all operating conditions while the second turbine 60 may do useful work using the recovered energy.

Figure 4:
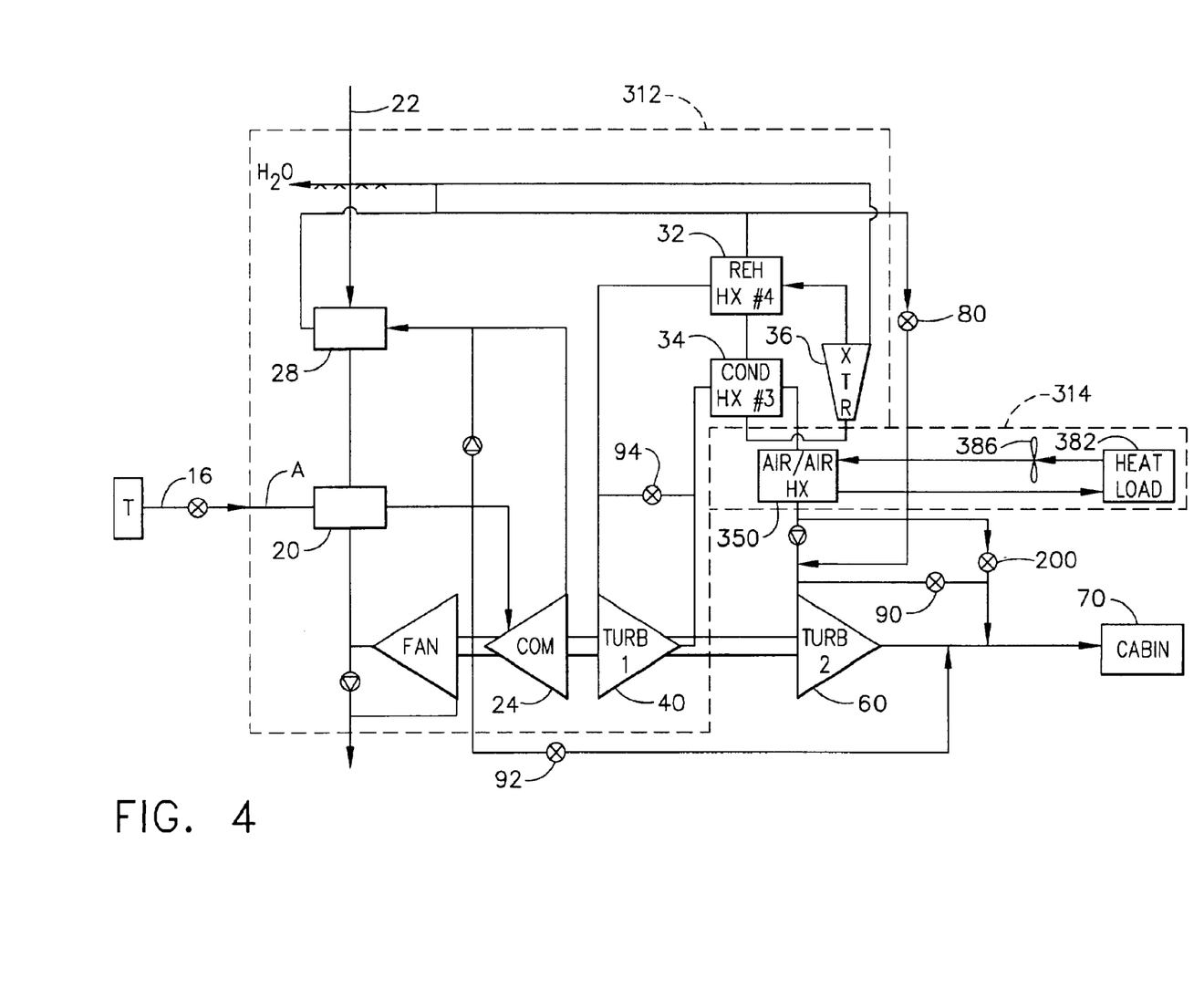
FIG. 4 shows a block diagram of a fourth embodiment of the present invention.

FIG. 4 presents an embodiment that is similar to FIG. 3 except that the heat load 382 may be cooled by a closed air loop 314. A fan 386 may circulate air in the closed air loop 314 over the air/air heat exchanger 350 which may exchange heat with the inlet air 'A' from air cycle sub-system 312 just as in the other embodiments. The embodiment of FIG. 4 also includes an altitude load cooling valve 200 as in the embodiment of FIG. 3. The advantage of this approach may be that the second turbine 60 may be bypassed to save even more energy by reducing air bleed when the ambient air is cooler then the desired cabin temperature.

Figure 5:
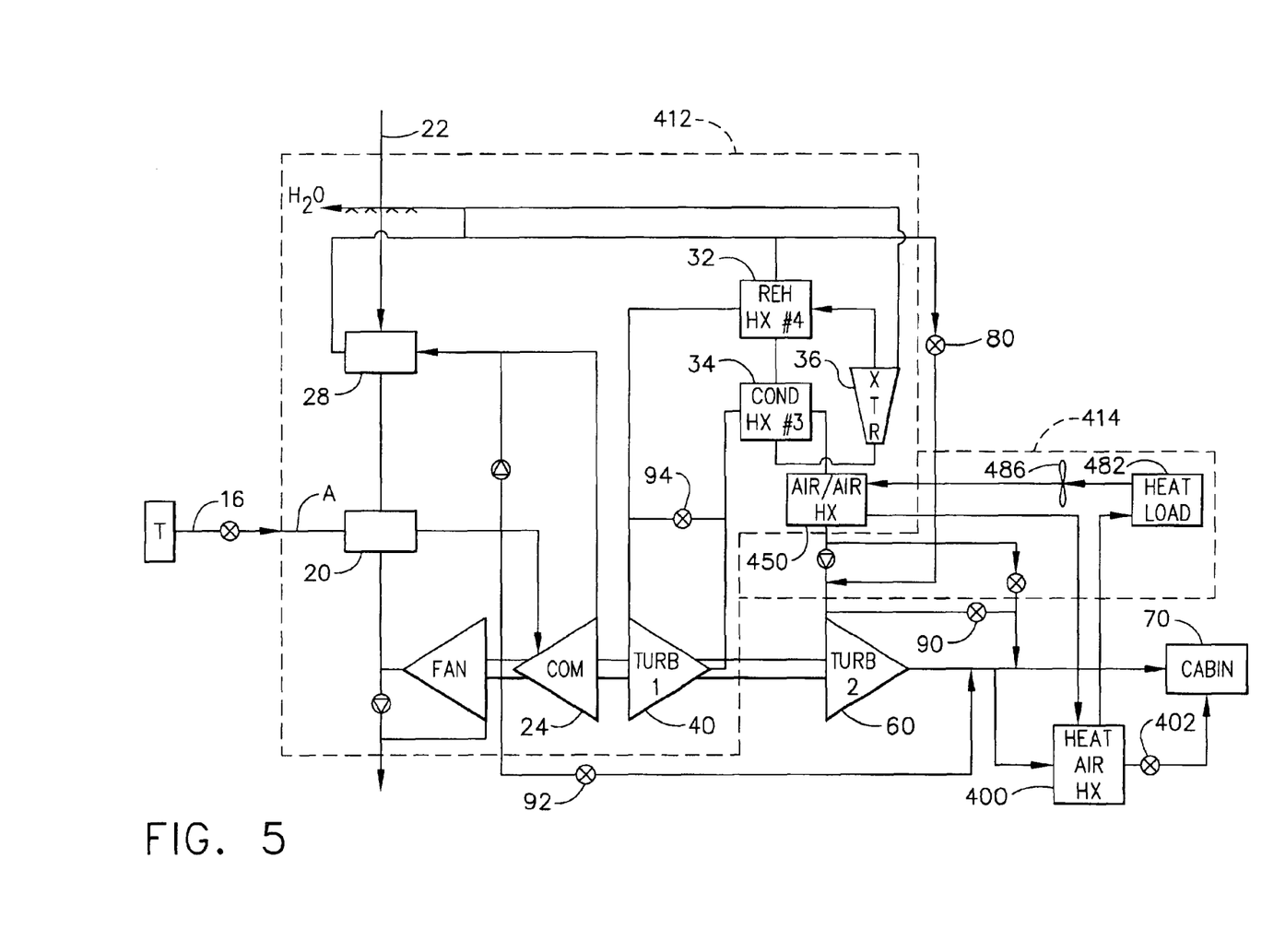
FIG. 5 shows a block diagram of a fifth embodiment of the present invention.

FIG. 5 shows an embodiment where an air/air heat exchanger 400 may be added to the closed air loop 414. Heat may be exchanged first through the air/air heat exchanger 450 with inlet air 'A' from air cycle sub-system 412 and then again through the second air/air heat exchanger 400 after the inlet air 'A' leaves second turbine 60. A valve 402 may control flow through the heat exchanger 400 and may allow the flow at altitude when the economy cooling valve 80 bypasses turbine 40 and the air cycle sub-system 412 so that the heat load 482 may have a constant source of cooling. By placing the heat exchanger 400 in a circuit location where it may be supplied with the coldest possible supply air temperature, minimum or no engine bleed inlet air flow may be needed to cool the heat load 482 at cool dry ambient conditions. While FIG. 5 shows an air closed loop 414 for cooling the heat load 482 it will be understood that a liquid closed loop could also be used.

Figure 6:
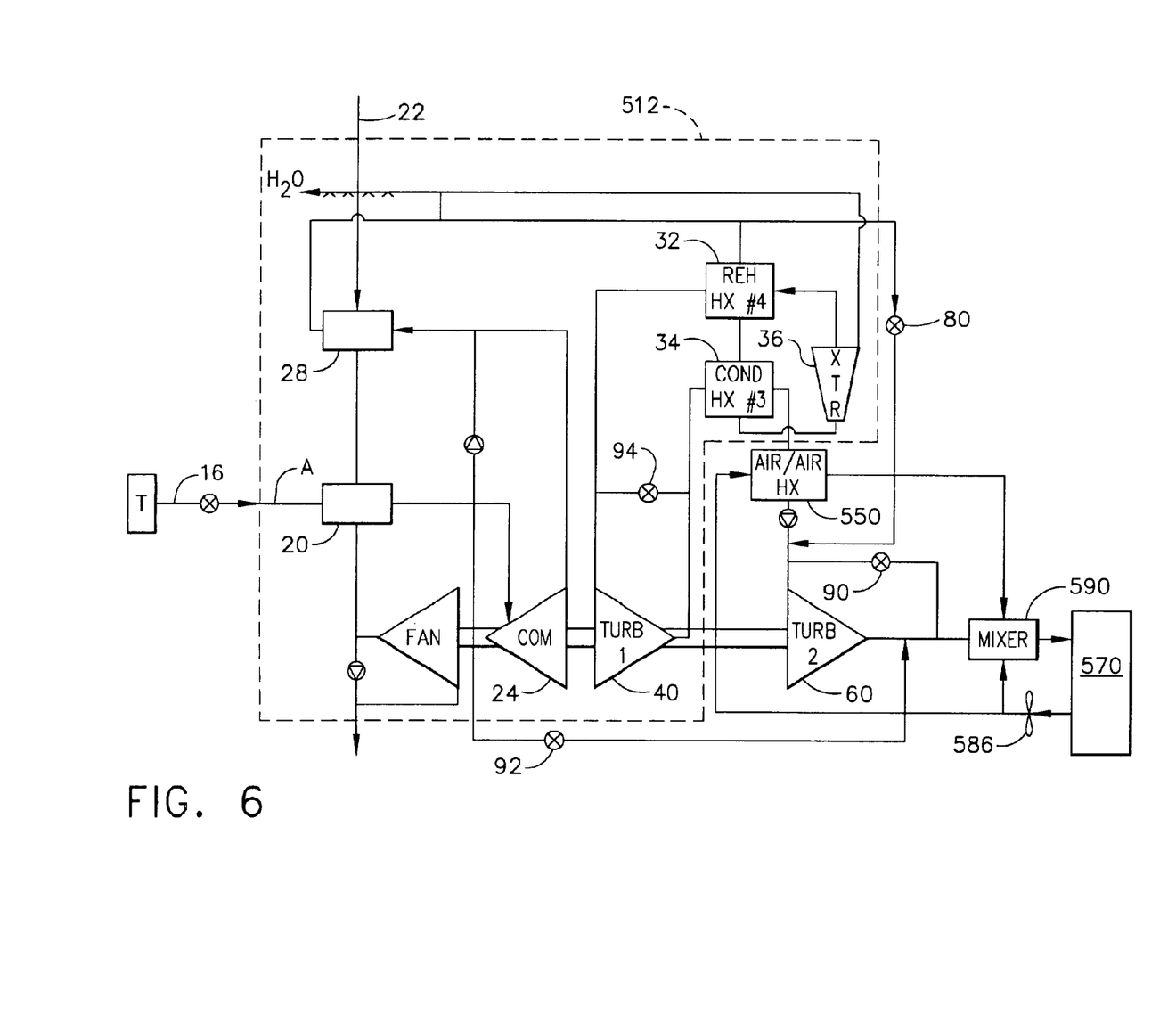
FIG. 6 shows a block diagram of a sixth embodiment of the present invention.

FIG. 6 also shows an embodiment where both the heat of vaporization and the energy of the cabin air are recovered in the second turbine 60. In this embodiment cabin 570 re-circulation air may be provided to an energy recovery heat exchanger 550 downstream of the first turbine 40 of air cycle sub-system 512. In the second turbine 60 both the heat of vaporization from the condenser 34 and a portion of the cabin heat load energy may be converted to useful energy. The re-circulated cabin air, moved by fan 586, may then be mixed with fresh inlet air 'A' from turbine 60 and with a portion of untreated cabin air in mixer 590. The advantage of this approach may be that waste energy from the cabin air may be recaptured in the second turbine 60.

It should be understood, of course, that the foregoing relates to preferred embodiments of the invention and that modifications may be made without departing from the spirit and scope of the invention as set forth in the following claims.

I claim:

1. A system for conditioning water-bearing inlet air for supply as conditioned air comprising;
   an inlet for taking inlet air from an air supply;
   a first heat exchanger for cooling the inlet air;
   a compressor for compressing the inlet air;
   a second heat exchanger for further cooling the inlet air;
   a condenser for still further cooling the inlet air and for extracting moisture from said inlet air;
   a first turbine expanding and cooling the inlet air which is then heated in said condenser;
   a third heat exchanger for heating said inlet air with waste heat from a heat load;
   a second turbine expanding said inlet air for use as said conditioned air to a space; and
   an economy valve for bypassing said condenser, said first turbine and said third heat exchanger and for supplying said inlet air directly to said second turbine.

2. The system of claim 1, wherein said heat load is electronic equipment.

3. The system of claim 1, wherein the third heat exchanger is a liquid to air heat exchanger.

4. The system of claim 3, wherein a fourth heat exchanger provides additional cooling for the heat load and wherein said fourth heat exchanger is located downstream from said second turbine.

5. A system for conditioning water bearing inlet air for supply to an aircraft interior comprising;
   an air cycle sub-system comprising; an inlet for taking air from a turbine bleed;
   a first heat exchanger, a compressor that compresses the inlet air, a second heat exchanger that cools the inlet air downstream from said compressor, a first turbine that expands and cools the inlet air;
   a second turbine downstream from said air cycle sub-system;
   an outlet for connecting said second turbine to a space to be conditioned by said inlet air,
   an economy valve for bypassing at least a portion of said air cycle subsystem and supplying said inlet air directly to said second turbine.

6. The system of claim 5, including a third heat exchanger heating said inlet air with waste heat from said aircraft avionics.

7. The system of claim 6, wherein liquid carries waste heat from said avionics to said third heat exchanger.

8. The system of claim 7, wherein a fourth heat exchanger exchanges heat from said liquid to the skin of said aircraft.

9. The system of claim 7, wherein a fourth heat exchanger exchanges heat from said liquid to said inlet air downstream from said second turbine.

10. A system for supplying conditioned air for use in a compartment of an aircraft comprising;
    an inlet for taking a first inlet air from an engine bleed;
    a first air cycle sub-system that cools, condenses and dehumidifies the first inlet air and that has a first outlet air;
    a second air cycle sub-system that takes a second inlet air from a heat load and supplies said second inlet air to a first heat exchanger, wherein said second air cycle sub-system heats said first outlet air to supply turbine inlet air; and
    a turbine that expands said turbine inlet air and supplies said conditioned air to said compartment.

11. The system for supplying conditioned air of claim 10, further comprising;
    a mixer for mixing said conditioned air from said turbine with said second inlet air.

12. The system for supplying conditioned air of claim 10, wherein an economy cooling bypass valve can bypass a portion of said first air cycle sub-system when said aircraft is operating at high altitudes.

13. A system for supplying conditioned air for use in an aircraft compartment comprising;
    an inlet for taking inlet air from a source;
    a first air cycle sub-system that cools, condenses and dehumidifies the inlet air and that has a first outlet air;
    said first air cycle sub-system includes a first turbine;
    a second air cycle sub-system that cools a heat load using air in a closed loop;
    a first heat exchanger receiving said first outlet air and heating the outlet air by placing it in heat exchange relationship with said air in said closed loop;
    a second turbine that expands said first outlet air and supplies conditioned air to said compartment;
    an economy bypass valve that opens to bypass at least a portion of said first air cycle sub-system at high altitude operation, to supply said inlet air directly to said second turbine.

14. The system for supplying conditioned air of claim 13, including; an aircraft skin heat exchanger in said second air cycle sub-system partially cooling said heat load.

15. The system for supplying conditioned air of claim 14, wherein said heat load includes aircraft avionics.

16. The system for supplying conditioned air of claim 13, wherein said first air sub-system includes a primary heat exchanger for cooling said inlet air using ambient air and a compressor for compressing said inlet air.

17. The system for supplying conditioned air of claim 16, wherein a condenser cools said inlet air and an extractor extracts condensate moisture to dehumidify said air and wherein a first turbine downstream from said condenser expands and cools the inlet air.

18. The system of claim 17, wherein an altitude load cooling valve opens at altitude to allow a partial flow of air through said air cycle sub-system even when said economy bypass valve is open.

19. A method for conditioning water-bearing inlet air for supply as conditioned air for an aircraft cabin comprising the steps of;
bleeding inlet air from an aircraft turbine engine;
cooling the inlet air with ambient air in a first heat exchanger;
compressing the inlet air;
further cooling the inlet air in a second heat exchanger;
still further cooling the inlet air in a condenser;
extracting moisture from said inlet air;
expanding and cooling said inlet air in a turbine;
reheating said inlet air in said condenser to capture energy from said extracting step;
heating said inlet air with a third heat exchanger using waste heat from said aircraft;
expanding said inlet air in a second turbine;
bypassing said first turbine when it is not needed.

20. The method of claim 19, wherein the step of heating said inlet air using waste heat includes the step of cooling aircraft avionics.

21. The method of claim 20, wherein the step of bypassing also bypasses said third heat exchanger and wherein said aircraft avionics is cooled by a fourth heat exchanger.

22. The method of claim 19, wherein the step of heating said inlet air using waste heat includes the step of cooling aircraft avionics using a liquid circulating sub-cycle.

23. The method of claim 19, wherein the step of heating said inlet air using waste heat includes the step of circulating cabin exhaust air through an air sub-cycle and later mixing it with said inlet air.

24. The method of claim 19, wherein the step of heating said inlet air using waste heat includes the step of circulating captive air through a closed loop air sub-cycle which includes a heat exchanger in communication with said inlet air.

25. A method for conditioning water-bearing inlet air for supply as conditioned air for an aircraft cabin comprising the steps of;
bleeding inlet air from an aircraft turbine engine;
expanding, cooling and dehumidifying the inlet air, in a first air cycle,
heating said inlet air with a heat exchanger using waste heat from said aircraft;
further expanding said inlet air in a turbine;
bypassing said first air cycle when the first air cycle is not needed to condition the inlet air.

26. The method of claim 25, wherein the waste heat comes from cooling aircraft avionics.

* * * * *